(12) United States Patent
Shimizu

(10) Patent No.: US 8,882,478 B2
(45) Date of Patent: Nov. 11, 2014

(54) TURBOCHARGER WITH ELECTRIC MOTOR

(75) Inventor: Masahiro Shimizu, Tokyo (JP)

(73) Assignee: IHI Corporation, Tokyo (JP)

( * ) Notice: Subject to any disclaimer, the term of this patent is extended or adjusted under 35 U.S.C. 154(b) by 1137 days.

(21) Appl. No.: 12/668,656

(22) PCT Filed: May 26, 2008

(86) PCT No.: PCT/JP2008/059661
§ 371 (c)(1),
(2), (4) Date: Jun. 25, 2010

(87) PCT Pub. No.: WO2009/008225
PCT Pub. Date: Jan. 15, 2009

(65) Prior Publication Data
US 2010/0266430 A1  Oct. 21, 2010

(30) Foreign Application Priority Data
Jul. 9, 2007 (JP) ................. 2007-180275

(51) Int. Cl.
*F02C 6/12*  (2006.01)
*H02K 7/14*  (2006.01)
*F02B 37/10*  (2006.01)
*F02B 39/10*  (2006.01)
*H02K 5/22*  (2006.01)

(52) U.S. Cl.
CPC ............. *F02B 39/10* (2013.01); *F05D 2220/40* (2013.01); *H02K 7/14* (2013.01); *F05D 2220/76* (2013.01); *F02B 37/10* (2013.01); *H02K 5/225* (2013.01); *F02C 6/12* (2013.01); *Y02T 10/144* (2013.01)
USPC ... 417/423.14; 417/407; 417/406; 417/423.7; 417/423.1; 123/559.1

(58) Field of Classification Search
USPC .............. 417/423.1, 423.7, 423.14, 405, 406, 417/407; 123/383, 559.1; 60/598; 310/419
See application file for complete search history.

(56) References Cited

U.S. PATENT DOCUMENTS 1,693,617 A * 12/1928 Oswald .......................... 388/836
4,613,288 A    9/1986 McInerney
(Continued)

FOREIGN PATENT DOCUMENTS

| JP | 46-8247 | 3/1971 |
| JP | 468247  | 3/1971 |

(Continued)

OTHER PUBLICATIONS

Office Action issued in corresponding Chinese Application No. 200880024060.X, dated Sep. 27, 2010.
(Continued)

*Primary Examiner* — Charles Freay
*Assistant Examiner* — Christopher Bobish
(74) *Attorney, Agent, or Firm* — Griffin & Szipl, P.C.

(57) ABSTRACT

A motor stator 9b and a flange portion 41 are integrally formed with each other, so that a stator assembly is formed. The flange portion 41 extends outward from a coil arrangement portion of the motor stator 9b in a radial direction, and at least a part of a radial outer face 41a of the flange portion 41 is exposed to the outside of a housing 7. The position of the stator assembly 12 can be adjusted with respect to the housing 7 in a circumferential direction along a circle that has an axial center of a rotating shaft 11 as a center thereof. A wiring hole 41b through which a cable passes is formed in the flange portion 41, and the wiring hole 41b is opened at the radial outer face 41a of the flange portion 41.

13 Claims, 6 Drawing Sheets

(56) References Cited

U.S. PATENT DOCUMENTS

| | | | |
|---|---|---|---|
| 5,870,894 A * | 2/1999 | Woollenweber et al. | 60/607 |
| 6,422,838 B1 * | 7/2002 | Sloteman | 417/423.5 |
| 6,668,553 B1 * | 12/2003 | Ghizawi | 60/605.3 |
| 6,845,617 B1 * | 1/2005 | Allen et al. | 60/607 |
| 7,360,361 B2 * | 4/2008 | Prusinski et al. | 60/608 |
| 7,453,175 B2 * | 11/2008 | Nakanishi et al. | 310/68 B |
| 7,704,054 B2 * | 4/2010 | Horvath et al. | 417/213 |
| 2002/0175574 A1 * | 11/2002 | Okazaki et al. | 310/68 B |
| 2006/0123783 A1 * | 6/2006 | Philippe | 60/607 |
| 2007/0041851 A1 * | 2/2007 | Shibui et al. | 417/374 |

FOREIGN PATENT DOCUMENTS

| | | |
|---|---|---|
| JP | 59-229018 | 12/1984 |
| JP | 59229018 A | 12/1984 |
| JP | 2006-514526 T | 4/2006 |
| JP | 2006-320143 | 11/2006 |
| JP | 2006-320143 A | 11/2006 |
| JP | 2007-040255 | 2/2007 |
| JP | 2007-40255 A | 2/2007 |
| WO | 98/02652 | 1/1998 |
| WO | 2005/024202 A1 | 3/2005 |

OTHER PUBLICATIONS

International Search Report, issued in corresponding No. PCT/JP2008/059661, completed Jun. 26, 2008, mailed Jul. 8, 2008.

Office Action issued on Jul. 28, 2011 in priority Japanese Patent Application No. 2007-180275.

Office Action issued in corresponding Korean application 10-2009-7025411 on Jul. 25, 2012.

* cited by examiner ial position of an opening of a wiring hole used to supply
TURBOCHARGER WITH ELECTRIC MOTOR This is a National Phase Application in the United States of International Patent Application No. PCT/JP2008/059661 filed May 26, 2008, which claims priority on Japanese Patent Application No. 2007/180275, filed Jul. 9, 2007. The entire disclosures of the above patent applications are hereby incorporated by reference.

BACKGROUND OF THE INVENTION

1. Field of the Invention

The present invention relates to a turbocharger with an electric motor. More particularly, the present invention relates to a turbocharger with an electric motor that includes an electric motor, a housing receiving the electric motor therein, and a current supply path, such as a cable, extending from a motor stator of the electric motor to the outside of the housing.

2. Description of the Related Art

A turbocharger is an apparatus that is driven by exhaust gas from engine, compresses intake air, and supplies the compressed air to the engine.

A turbocharger is disclosed in, for example, in Patent Document 1. FIG. 1 is a schematic view of a turbocharger with an electric motor of Patent Document 1. As shown in FIG. 1, as basic structures, the turbocharger includes a turbine impeller 71 that is rotationally driven by exhaust gas from an engine, a rotating shaft 75 of which one end is fixed to the turbine impeller 71, and a compressor impeller 77 that is integrally rotated with a turbine impeller 71 fixed to the other end of the rotating shaft 75. In this structure, the turbine impeller 71 and the compressor impeller 77 are integrally and rotationally driven by the exhaust gas from the engine, so that the compressor impeller 77 compresses intake air and supplies the compressed air to the engine.

Among turbochargers, a turbocharger in which an electric motor is built therein is referred to as a turbocharger with an electric motor. The turbocharger of FIG. 1 is a turbocharger with an electric motor. As shown in FIG. 1, an electric motor 79 assists a rotating shaft 75 in accelerating, and increases the amount of compressed air supplied from the compressor impeller 77 to the engine. Further, the electric motor 79 includes a motor rotor 79a that is fixed to the rotating shaft 75, and a motor stator 79b that is fixed to the housing 81 outside the motor rotor 79b and rotationally drives the motor rotor 79a.

The motor stator includes coils that generate a magnetic field used to rotationally drive the motor rotor, and a plurality of coils is arranged in a circumferential direction along a circle that has an axial center of the rotating shaft as a center thereof. In order to supply current to these coils, a cable is wired so as to be connected to the coils and then wired to extend to the outside of the turbocharger. This wiring structure is disclosed in, for example, Patent Documents 1 to 3.

In Patent Document 1, as shown in FIG. 1, a connector 85 is attached to a motor stator 79b, and a wiring hole 87, which is used to guide a cable connected to the connector 85 to the outside of the turbocharger, is formed in a housing 81.

In Patent Document 2, as shown in FIG. 2, a wiring hole 93, which is used to supply current and electric power to a motor stator 91, extends in an axial direction, and is opened at a compressor housing 94.

In Patent Document 3, as shown in FIG. 3, a wiring hole 98, through which a cable 97 passes in order to supply current to a motor stator 95, is formed in a housing 99.

Patent Document 1: PCT Japanese Translation Patent Publication No. 2006-514526
Patent Document 2: WO 2005/024202 A1
Patent Document 3: WO 98/02652

However, in Patent Documents 1 to 3, the wiring hole is positioned at one position in the circumferential direction. For this reason, the position of the opening of the wiring hole cannot be adjusted on the housing in the circumferential direction in accordance with the structure of the engine on which the turbocharger is mounted.

That is, since the take-out position of the cable on the housing is limited to one position in the circumferential direction, the take-out position of the cable needs to be changed in some engines on which the turbocharger is mounted. For example, the structure of the engine on which the turbocharger is mounted closes up the take-out position of the cable, so that the cable may not be taken out at the take-out position. In this case, whenever the take-out position of the cable needs to be changed in the circumferential direction, separate turbocharger parts, of which the opening of the wiring hole serving as the take-out position is formed at different positions in the circumferential direction, need to be prepared.

SUMMARY OF THE INVENTION

An object of the present invention is to provide a turbocharger with an electric motor that can adjust a circumferential position of an opening of a wiring hole used to supply current to a motor stator of an electric motor without preparing separate parts.

In order to achieve the above-mentioned object, there is a turbocharger with an electric motor in which a turbine impeller is connected to one end of a rotating shaft, a compressor impeller is connected to the other end of the rotating shaft, the rotating shaft is rotatably supported by a housing, the rotating shaft is rotationally driven by an electric motor provided in the housing, and the electric motor includes a motor rotor that is fixed to the rotating shaft and a motor stator that surrounds the motor rotor and rotationally drives the motor rotor, the turbocharger comprising:

a stator assembly that includes the motor stator and a flange portion integrally formed with the motor stator, wherein the position of the stator assembly is adjusted with respect to the housing in a circumferential direction along a circle that has an axial center of the rotating shaft as a center thereof, the flange portion extends outward from a coil arrangement portion of the motor stator in a radial direction, at least a part of a radial outer face of the flange portion is exposed to the outside of the housing, the flange portion includes a wiring hole through which a cable connected to coils of the motor stator passes, and the wiring hole is opened at the radial outer face of the flange portion.

In the above-mentioned structure, the flange portion integrally formed with the motor stator extends outward from the coil arrangement portion of the motor stator in the radial direction, at least a part of the radial outer face of the flange portion is exposed to the outside of the housing, the relative position of the stator assembly with respect to the housing can be adjusted in the circumferential direction, and the opening of the wiring hole is formed at the radial outer face of the flange portion. Due to this structure, the circumferential position of the stator assembly is adjusted with respect to the housing, so that the circumferential position of the opening of the wiring hole can be adjusted. Therefore, it is possible to adjust the circumferential position of the opening of the wiring hole without preparing separate parts.

According to a preferable aspect of the present invention, the housing includes first and second housing members that are connected to each other, and the flange portion is held and fixed between the first and second housing members so that the position of the flange portion is adjusted with respect to the first and second housing members in the circumferential direction.

In the above-mentioned structure, the flange portion is held and fixed between the first and second housing members so that the position of the flange portion is adjusted with respect to the first and second housing members in the circumferential direction. Therefore, when the flange portion is held and fixed between the first and second housing members, it is possible to adjust the circumferential position of the flange portion, and to adjust the circumferential position of the opening of the wiring hole that is formed on the radial outer face of the flange portion.

Further, when the first and second housing members are connected to each other in the axial direction, the flange portion is held and fixed between the first and second housing members. Accordingly, the radial outer face of the flange portion may not be covered with the housing in portions except for the portions that connect the first housing member to the second housing member. For this reason, in the circumferential range except for the portions that connect the first housing member to the second housing member, it is possible to expose the radial outer face of the flange portion to the outside of the housing and to adjust the circumferential position of the opening of the wiring hole in this range.

According to a preferable aspect of the present invention, the housing includes a portion that is positioned outside the radial outer face of the flange portion in the radial direction, and notches, which extend in the circumferential direction along the circle that has the axial center of the rotating shaft as a center thereof, are formed at the portion.

In the above-mentioned structure, when the housing has a portion that is positioned outside the radial outer face of the flange portion in the radial direction, the notches extending in the circumferential direction are formed at this portion. Therefore, the opening of the wiring hole formed on the radial outer face of the flange portion can be exposed to the outside of the housing through the notches. In addition, since the notches extend in the circumferential direction, it is possible to adjust the circumferential position of the opening of the wiring hole in the circumferential range where the notches extend in the circumferential direction.

According to a preferable aspect of the present invention, the housing includes a cooling space in which coolant for cooling the motor stator flows, and the flange portion is arranged to come in contact with the coolant or a cooling space forming member that forms at least a part of an inner surface of the cooling space.

In the above-mentioned structure, the flange portion can be cooled by the coolant in the cooling space, and the cable for supplying current to the motor stator in the flange portion can pass through the flange portion. Therefore, it is possible to effectively cool the cable.

According to a preferable aspect of the present invention, the flange portion forms at least a part of a flow path face of a compressed air flow path that guides compressed air from the compressor impeller.

In the above-mentioned structure, since the flange portion forms at least a part of the flow path face of the compressed air flow path that guides the compressed air from the compressor impeller, it is possible to maintain the cable at low temperature.

That is, the temperature of the compressed air from the compressor impeller is lower than that of the exhaust gas delivered to the turbine impeller, and the cable passes through the flange portion forming the compressed air flow path 33 in which the low-temperature compressed air flows. Therefore, it is possible to keep the cable under low-temperature environment. As a result, it is possible to maintain the cable at low temperature.

According to the above-mentioned present invention, in the turbocharger with an electric motor, it is possible to adjust a circumferential position of an opening of a wiring hole used to supply current to a motor stator of an electric motor without preparing separate parts.

DESCRIPTION OF THE PREFERRED EMBODIMENTS

Figure 1:
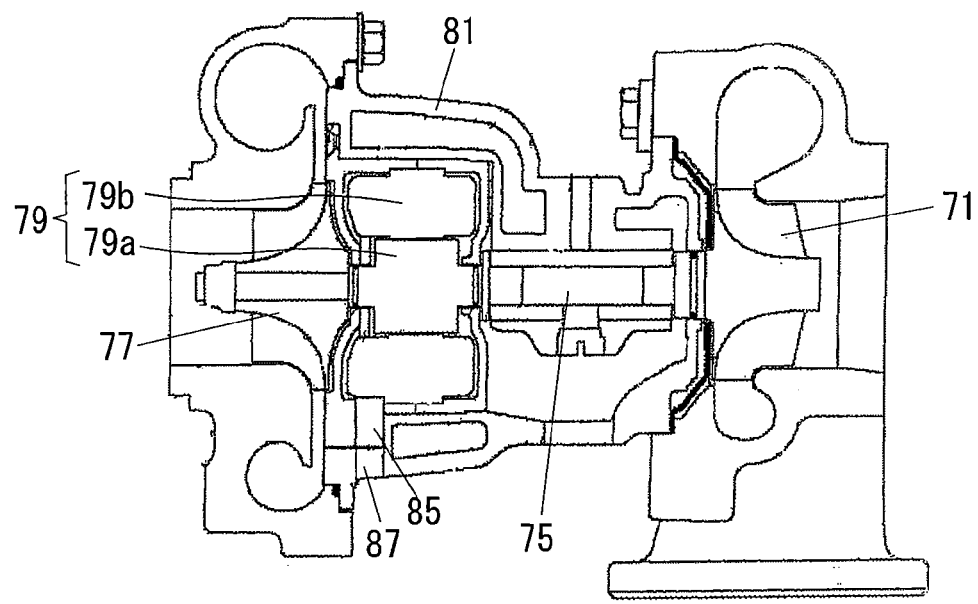
FIG. 1 is a schematic view of a turbocharger with an electric motor of Patent Document 1.
Figure 2:
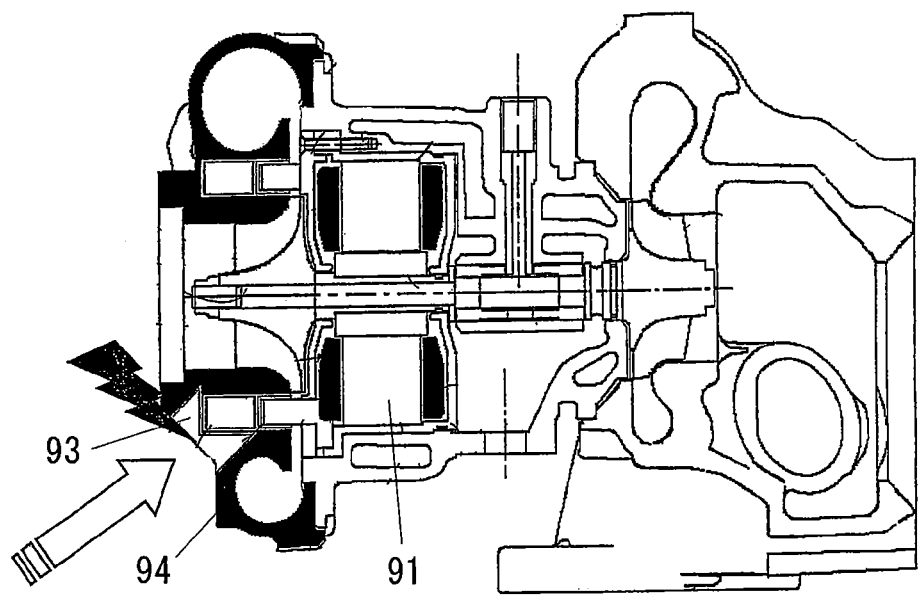
FIG. 2 is a schematic view of a turbocharger with an electric motor of Patent Document 2.
Figure 3:
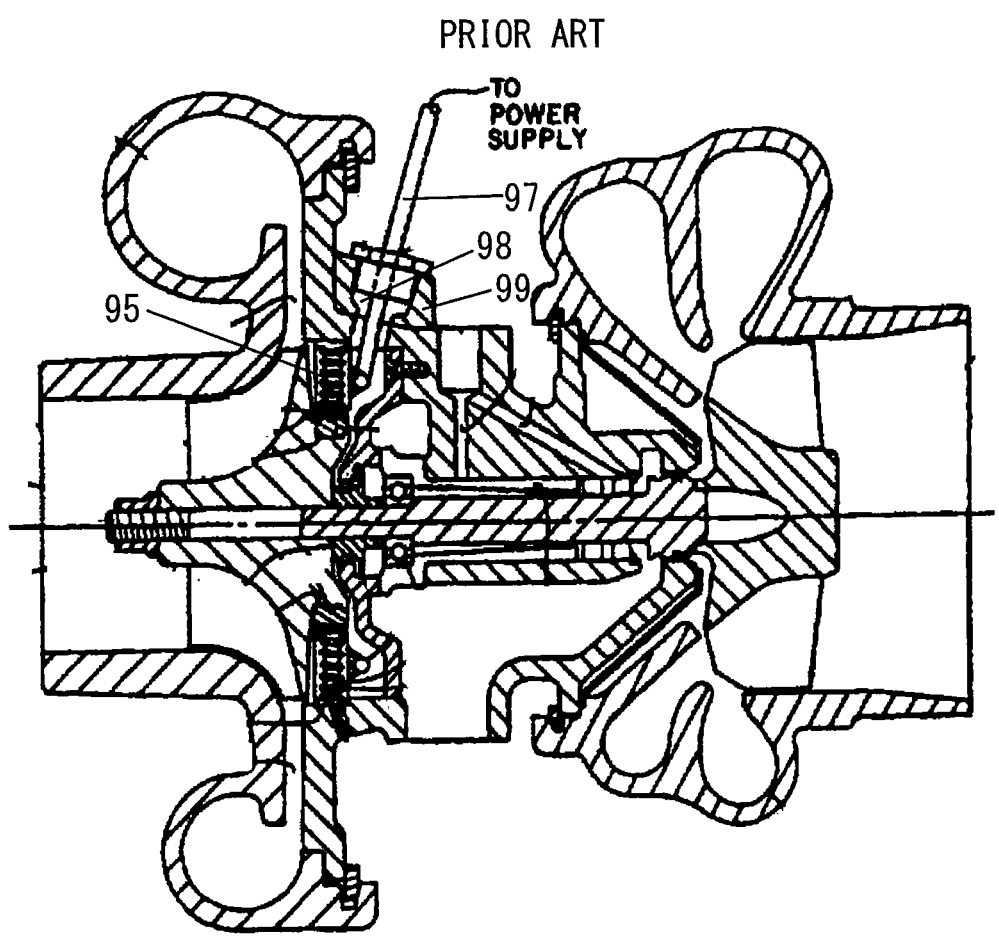
FIG. 3 is a schematic view of a turbocharger with an electric motor of Patent Document 3.

A preferred embodiment of the present invention will be described with reference to the accompanying drawings. In this case, in each of the drawings, the same reference numerals are attached to the common portions, and an overlapping description will be omitted.

Figure 4:
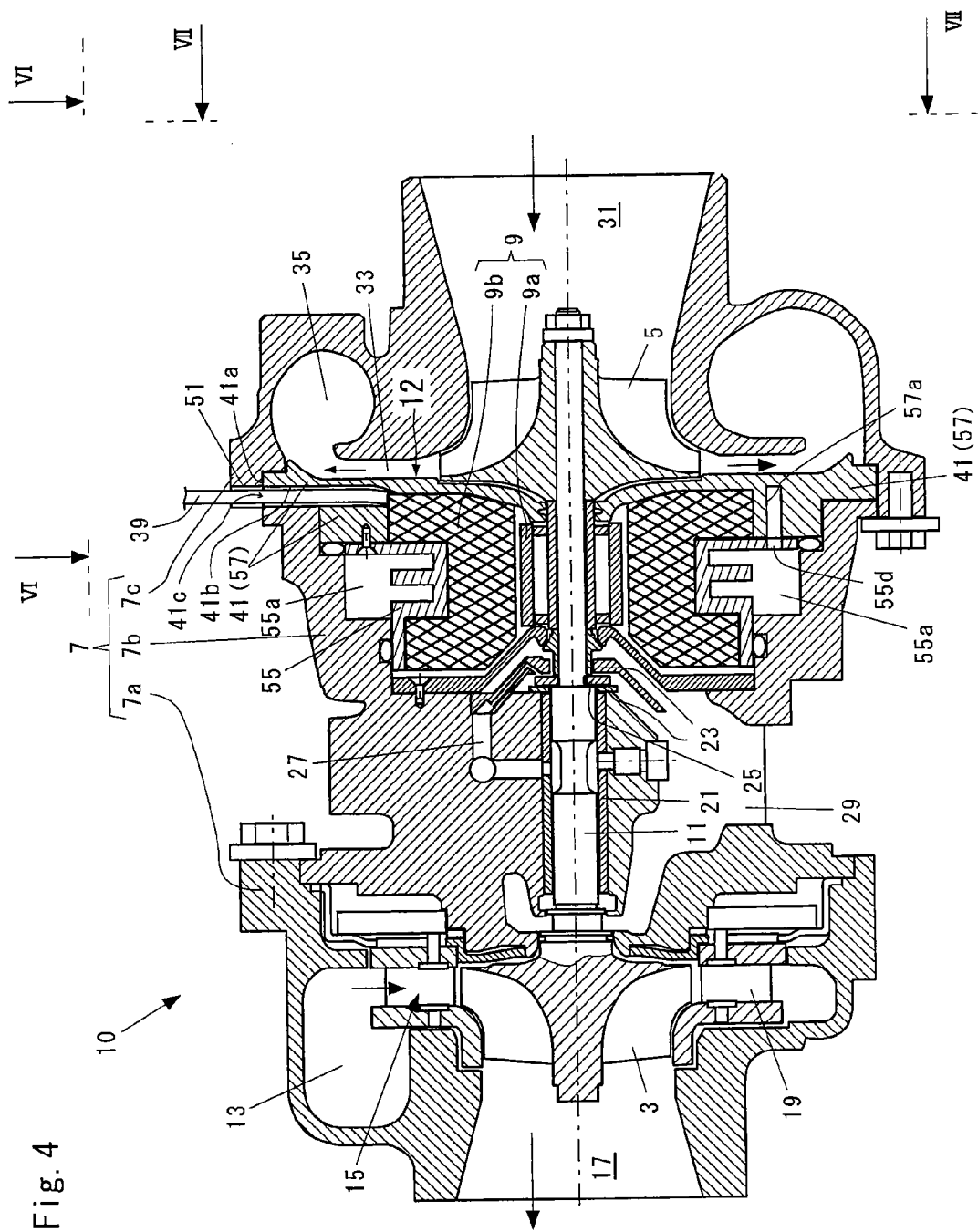
FIG. 4 is a schematic view of a turbocharger with an electric motor according to an embodiment of the present invention.

FIG. 4 is a schematic view of a turbocharger with an electric motor according to an embodiment of the present invention. As shown in FIG. 4, a turbocharger 10 with an electric motor includes a turbine impeller 3, a compressor impeller 5, a housing 7, and an electric motor 9.

The turbine impeller 3 is a vane that is fixed to one end (a left end in FIG. 4) of a rotating shaft 11 and rotationally driven by the exhaust gas from an engine. The turbine impeller 3 has been integrally formed with the rotating shaft 11 in this embodiment, but the turbine impeller 3 may be manufactured as a part separate from the rotating shaft 11 and then attached to the rotating shaft 11.

The compressor impeller 5 is a vane that is fixed to the other end (a right end in FIG. 4) of the rotating shaft 11, compresses intake air, and delivers the compressed air to an engine. That is, as the turbine impeller 3 is rotationally driven by the exhaust gas, the compressor impeller 5 is integrally and rotationally driven together with the turbine impeller 3 and the rotating shaft 11, compresses intake air, and delivers the compressed air to the engine as combustion gas.

The housing 7 receives the turbine impeller 3, the rotating shaft 11, and the compressor impeller 5 therein, and supports the rotating shaft 11 by a bearing (for example, a bearing metal 21 to be described below) so that the rotating shaft can be rotated. The housing 7 includes a turbine housing 7a, a bearing housing 7b, and a compressor housing 7c.

The turbine housing 7a receives the turbine impeller 3 therein. Further, a scroll chamber 13, an annular flow path 15, and an exhaust port 17 are formed in the turbine housing 7a. Exhaust gas is introduced from the engine to the scroll chamber 13. The annular flow path 15 has an annular shape as seen in an axial direction (in this specification, the axial direction means an axial direction of the rotating shaft 11) of the rotating shaft 11, and guides the exhaust gas, which is introduced to the scroll chamber 13, to the turbine impeller 3 inward in a radial direction (in this specification, the radial direction means an radial direction of the rotating shaft 11) of the rotating shaft 11. The exhaust gas, which has rotationally driven the turbine impeller 3, is discharged to the outside of the turbocharger 10 through the exhaust port 17.

In addition, a plurality of nozzle vanes 19 is arranged in the flow path 15 at regular intervals in a circumferential direction. In the embodiment of FIG. 1, the nozzle vane 19 is a variable nozzle vane, and a flow path area formed between the variable nozzle vanes can vary. However, the present invention is not limited thereto, and the nozzle vane may be a stationary nozzle vane or is not provided. Meanwhile, in this specification, the circumferential direction is a direction on the plane perpendicular to the axial direction of the rotating shaft 11, and is a direction along a circle that has an axial center of the rotating shaft 11 as a center thereof.

A bearing metal 21, a thrust bearing 23 and the like are provided in the bearing housing 7b. The bearing metal 21 is provided in the bearing housing 7b, receives a radial load from the rotating shaft 11, and supports the rotating shaft 11 so that the rotating shaft can be rotated. The thrust bearing 23 is fixed to the bearing housing 7b, receives an axial load from a thrust collar 25 provided on the rotating shaft 11, and restricts the movement of the rotating shaft 11 in the axial direction. Meanwhile, reference numeral 27 indicates a lubricating oil flow path through which lubricating oil is supplied to the bearing metal 21, the thrust bearing 23, and the thrust collar 25. Reference numeral 29 indicates an oil discharge port through which the lubricating oil is discharged.

The compressor housing 7c receives the compressor impeller 5 therein. Further, an intake port 31, a compressed air flow path 33, and a scroll chamber 35 are formed in the compressor housing 7c. Air outside the turbocharger 10 is sucked through the intake port 31. The compressed air flow path 33 guides air, which is sucked from the intake port 31 and compressed by the compressor impeller 5, outward in the radial direction. The compressed air guided by the compressed air flow path 33 is discharged from a discharge port (not shown) to the outside of the turbocharger 10 through the scroll chamber 35, and then supplied to the engine. Meanwhile, in the embodiment of FIG. 4, the compressed air flow path 33 is an annular diffuser flow path as seen in the axial direction. Further, a plurality of vanes may be arranged in a diffuser flow path 33 at intervals in the circumferential direction.

The electric motor 9 includes a motor rotor 9a and a motor stator 9b. For example, a brushless AC electric motor, which includes a motor rotor 9a and a motor stator 9b, may be applied as the electric motor 9. Further, it is preferable that the AC electric motor can correspond to the high speed rotation (for example, at least 100 thousand to 200 thousand rpm) of the rotating shaft 11, can rotationally drive at the time of acceleration, and can generate electricity at the time of deceleration. When the turbocharger 10 is mounted on a vehicle, it is preferable that a driving voltage of the AC electric motor be equal to or higher than a DC voltage (for example, 12 V) of a battery mounted on a vehicle.

The motor rotor 9a is fixed to the rotating shaft 11. The motor rotor 9a may be formed of a magnetic material, and may be composed of a permanent magnet. The motor stator 9b is fixed to the housing 7 outside the motor rotor 9a in a radial direction of the motor rotor, and rotationally drives the motor rotor 9a. A plurality of motor stators 9b may be arranged at intervals in the circumferential direction.

Figure 5:
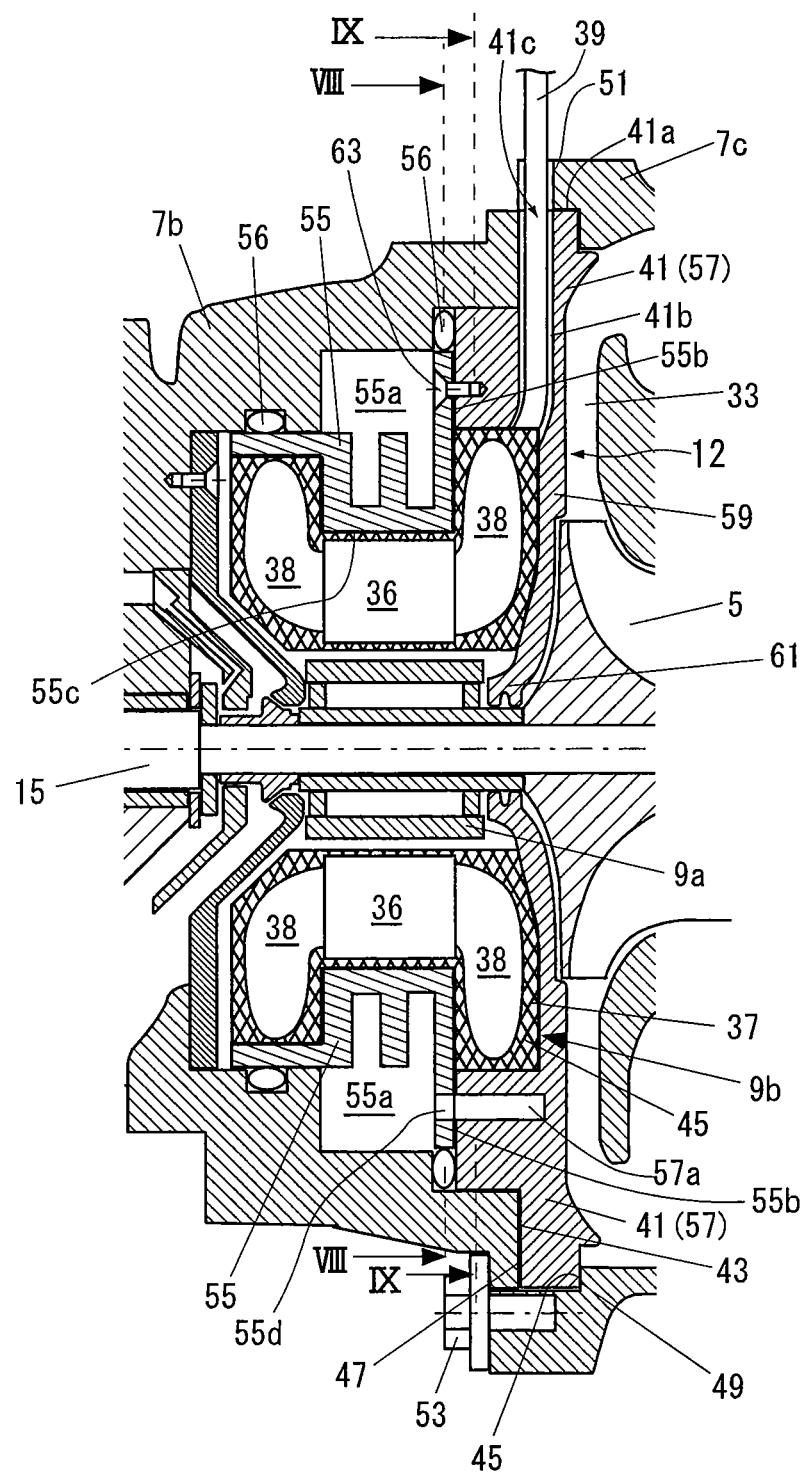
FIG. 5 is an enlarged view of a portion near a motor stator of FIG. 4.

FIG. 5 is an enlarged view of a portion near a motor stator 9b of FIG. 4. As shown in FIG. 5, each of the motor stators 9b includes a core 36 that is composed of laminated steel plates, and coils 38 that are wound around the core 36. The core 36 and the coils 38 are embedded in a thermally-conductive mold material 37 and integrally formed.

The turbocharger 10 with an electric motor includes a structure that is used to take out a cable 39 connected to the coils 38 of the motor stator 9b. For this reason, according to this embodiment, a flange portion 41 is integrally formed with the motor stator 9b. The flange portion 41 extends outward from a coil arrangement portion of the motor stator 9b in the radial direction, and at least a portion of the radial outer face 41a of the flange portion 41 is exposed to the outside of the housing 7. Hereinafter, the structure, which is composed of the motor stator 9b and the flange portion 41, is referred to as a "stator assembly 12".

A wiring hole 41b, which is used as a current supply path to the coils 38 of the motor stator 9b, is formed in the flange portion 41. An opening 41c of the wiring hole 41b is formed on the radial outer face 41a of the flange portion 41. In the embodiment of FIGS. 4 and 5, the cable 39 used as a current supply line passes through the wiring hole 41b. The end of the cable 39 is connected to the coils 38, and the cable 39 is led from the opening 41c to the outside of the housing 7 through the wiring hole 41b.

The housing 7 and the stator assembly 12 have shapes so that the relative positions thereof in the circumferential direction can be adjusted. In the embodiment of FIGS. 4 and 5, the flange portion 41 is formed to extend outward from the motor stator 9b in the radial direction, and a through hole through which the rotating shaft 11 and the motor rotor 9a pass through is formed at the center of the motor stator 9b in the radial direction. Further, an internal space, in which the motor stator 9b and the flange portion 41 can be arranged at an arbitrary position in the circumferential direction, is formed in the housing 7. Due to the above-mentioned shape, it is possible to arrange the stator assembly 12, which is composed of the flange portion 41 and the motor stator 9b, at an arbitrary position of the housing 7 in the circumferential direction.

In the embodiment of FIG. 5, each of the bearing housing 7b and the compressor housing 7c has an annular or substantially annular shape as seen from in the axial direction. Further, the bearing housing and the compressor housing include substantially annular faces 43 and 45 oriented in the axial direction so as to face each other. In contrast, the flange portion 41 includes a first substantially annular face 47 that comes in contact with the substantially annular face 43 of the bearing housing 7b and is oriented in the axial direction, and a second substantially annular face 49 that comes in contact with the substantially annular face 45 of the compressor housing 7c and is oriented in the axial direction.

Each of the first and second substantially annular faces 47 and 49 has an annular or substantially annular shape as seen in the axial direction, and the first and second substantially annular faces are oriented in an axial direction so as to be opposite to each other. Due to the above-mentioned shape, after the flange portion 41 is positioned at an arbitrary position in the circumferential direction, the first substantially annular face 47 comes in contact with the substantially annular face 43 of the bearing housing 7b that is a first housing member and the second substantially annular face 49 comes in contact with the substantially annular face 45 of the compressor housing 7c that is a second housing member. In this state, the flange portion 41 can be held between the substantially annular face 43 of the bearing housing 7b and the substantially annular face 45 of the compressor housing 7c by fixing bolts 53. Accordingly, the stator assembly 12, which is composed of the flange portion 41 and the motor stator 9b, can be reliably fixed to the housing 7 at an arbitrary position in the circumferential direction, and a reaction force that is applied to the motor stator 9b by the rotational drive of the motor rotor 9a can be reliably supported by the housing 7.

Figure 6:
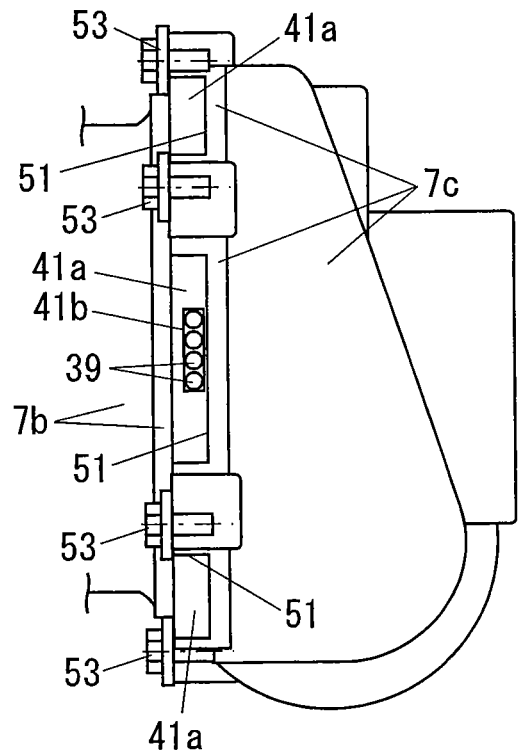
FIG. 6 is a view seen from a line VI-VI of FIG. 4.

If the housing 7 (the compressor housing 7c in the embodiment of FIGS. 4 and 5) has a portion of the radial outer face 41a of the flange portion 41 that is positioned at an outward position in the radial direction, notches 51 are formed at this portion. FIG. 6 is a view seen from a line VI-VI of FIG. 4. As shown in FIG. 6, the notches 51 extend in the circumferential direction. Accordingly, even though the compressor housing 7c extends so as to cover the radial outer face 41a of the flange portion 41, the opening 41c of the wiring hole 41b can be exposed to the outside of the housing 7 through the notches 51 of the compressor housing 7c.

Figure 7:
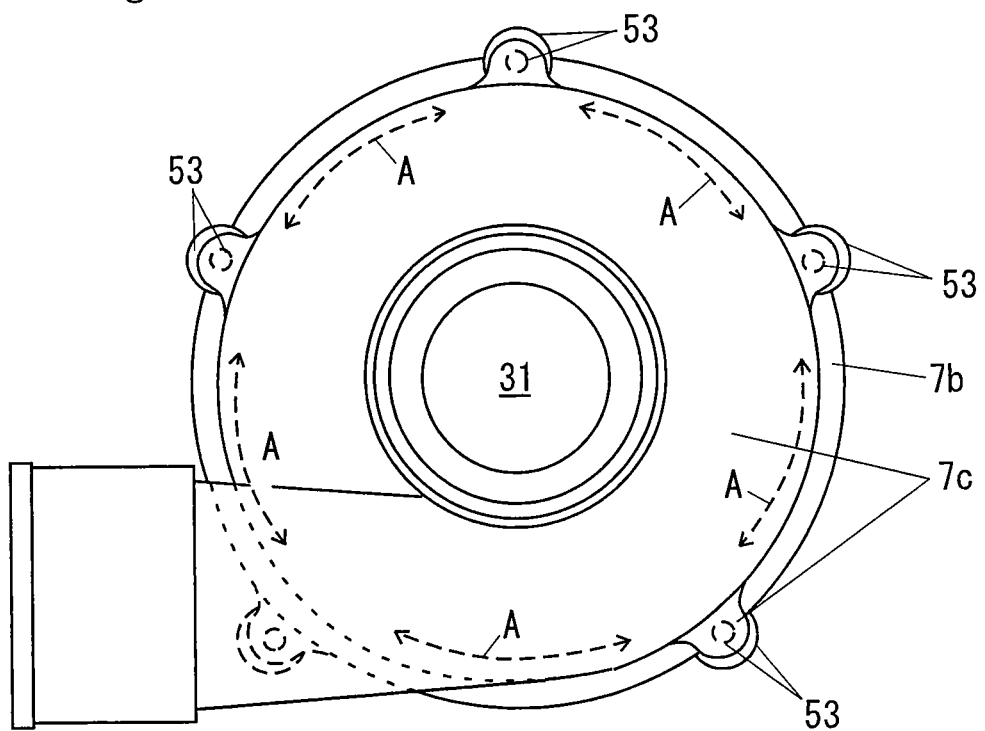
FIG. 7 is a view seen from a line VII-VII of FIG. 4.

FIG. 7 is a view seen from a line VII-VII of FIG. 4. The outer circumferential portions of the bearing housing 7b and the compressor housing 7c are connected to each other by the fixing bolts 53 that are provided at intervals in the circumferential direction. As shown in FIG. 7, a plurality of notches 51 is formed in the ranges indicated by reference character "A". That is, the plurality of notches 51 extends in the circumferential direction on the portion of the compressor housing 7c between the fixing bolts 53. In this embodiment, five notches 51 are formed.

In FIG. 5, a cooling space 55a in which coolant for cooling the motor stator 9b flows is formed in the housing 7. The flange portion 41 is arranged so as to come in contact with coolant as described below. The cooling space 55a is formed by a cooling space forming member 55.

The cooling space forming member 55 is provided in the housing 7 (the bearing housing 7b in the embodiment of FIGS. 4 and 5), and positioned outside the motor stator 9b in the radial direction so as to form at least a part of an inner surface of the cooling space 55a. In the embodiment of FIG. 4, the cooling space forming member 55 is a sleeve that has a cylindrical space therein in the radial direction, and forms a cooling space 55a between the inner surface of the bearing housing 7b and itself.

Meanwhile, the shape of the cooling space 55a is not limited to the embodiment of FIG. 5, and the cooling space forming member 55 may form a part of the inner surface of the cooling space 55a. For example, a cooling space 55a may be formed in the cooling space forming member 55 so that the cooling space forming member 55 forms the entire inner surface of the cooling space 55a.

The cooling space 55a is positioned outside the electric motor 9 (that is, the motor stator 9b) in the radial direction, and the cooling space 55a and the motor stator 9b are positioned on one side of the flange portion 41 (or an air flow path forming member 57 to be described below) opposite to the compressed air flow path 33. Coolant for cooling the electric motor 9 (that is, the motor stator 9b) flows in the cooling space 55a. The coolant is supplied to the cooling space 55a from the outside of the turbocharger 10, flows in the cooling space 55a, and is then discharged to the outside of the turbocharger 10. Meanwhile, it is preferable that the coolant is cooling water, but may be other coolant such as cooling oil.

As shown in FIG. 5, the cooling space forming member 55 includes a first contact face 55b that is positioned on one side of the flange portion 41 (that is, the air flow path forming member 57) opposite to the compressed air flow path 33 and comes in contact with the flange portion 41, and a second contact face 55c that is positioned outside the motor stator 9b in the radial direction and comes in contact with the motor stator 9b.

Further, through holes 55d, which form a part of the cooling space 55a, are formed in the cooling space forming member 55 so as to be opened to the first contact face 55b. That is, the through holes 55d are formed to pass through the cooling space forming member 55 from the cooling space 55a. Accordingly, the through holes 55d form a part of the cooling space 55a, and the coolant passing through the through holes 55d comes in contact with the flange portion 41.

Meanwhile, reference numeral 56 indicates a seal member such as an O-ring, and the seal member 56 prevents the coolant from leaking in the cooling space 55a. Further, the contact surface between the cooling space forming member 55 and the flange portion 41 is sealed by, for example, a liquid gasket or a solid gasket.

Further, the flange portion 41 forms at least a part of a flow path face of the compressed air flow path 33 that guides the compressed air from the compressor impeller 5.

In the embodiment of FIGS. 4 and 5, the flange portion 41 is a part of the air flow path forming member 57 that forms at least a part of the flow path face of the compressed air flow path 33.

The air flow path forming member 57 is provided in the housing 7. In the embodiment of FIGS. 4 and 5, the flange portion 41, which is a part of the air flow path forming member, is held and fixed between the bearing housing 7b and the compressor housing 7c. The air flow path forming member 57 forms at least a part of the flow path face of the compressed air flow path 33 that guides the compressed air from the compressor impeller 5 to the outside of the rotating shaft 11 in the radial direction.

In the embodiment of FIGS. 4 and 5, as seen in the axial direction, the air flow path forming member 57 has a substantially annular shape where a hole through which the rotating shaft 11 passes is formed at the center thereof. The air flow path forming member 57 forms the flow path face of the compressed air flow path 33 facing the turbine impeller 3, and the flow path face of the compressed air flow path 33 facing the compressor impeller 5 is formed by the compressor housing 7c. However, the present invention is not limited thereto, and the air flow path forming member 57 may form at least a part of the flow path face of the compressed air flow path 33. In some cases, the air flow path forming member 57 may form the entire flow path face of the compressed air flow path 33.

Further, the air flow path forming member 57 is arranged so as to come in contact with the cooling space forming member 55. Recessed portions 57a, which receive the coolant from the through holes 55d, are formed on the surface of the flange portion 41 (that is, the air flow path forming member 57) that comes in contact with the cooling space forming member 55. Therefore, the coolant from the through holes 55d is received in the recessed portions 57a.

As shown in FIG. 5, the air flow path forming member 57 includes the flange portion 41, an inner extension portion 59 that extends inward from the flange portion 41 in the radial direction of the rotating shaft 11 and is positioned between the motor stator 9b and the compressed air flow path 33 or the compressor impeller 5, and a labyrinth seal portion 61 that is provided at an inner portion of the inner extension portion 59 in the radial direction and forms a labyrinth seal between the rotating shaft 11 and itself.

In the embodiment of FIG. 5, the labyrinth seal portion 61 seals a portion between itself and a part of the motor rotor 9a fixed to the rotating shaft 11, and has two protrusions that protrude inward in the radial direction from the labyrinth seal portion at intervals in the axial direction.

In the embodiment of FIG. 5, the flange portion 41 (that is, the air flow path forming member 57) is integrally molded with the motor stators 9b by the mold material 37. For example, the core 36, the coils 38, and the air flow path forming member 57 are arranged in a predetermined mold (inside a mold), and the mold material 37 is injected into the mold so as to be filled between the motor stator 9b and the air flow path forming member 57. Therefore, the motor stator 9b is integrated with the air flow path forming member 57. As a result, the stator assembly 12 can be manufactured.

Meanwhile, it is preferable that the mold material 37 have high thermal conductivity. Further, it is preferable that the mold material 37 have low coefficient of thermal expansion. For example, STYCAST 2850FT (a product manufactured by Ablestik Japan Co., Ltd. Emerson & Cuming, Inc.) that has a thermal conductivity of $10^{-4}$ cal/cm·sec·° C. and a coefficient of thermal expansion of $10^{-6}$ cm/cm/° C. may be used as the mold material 37.

Figure 8:
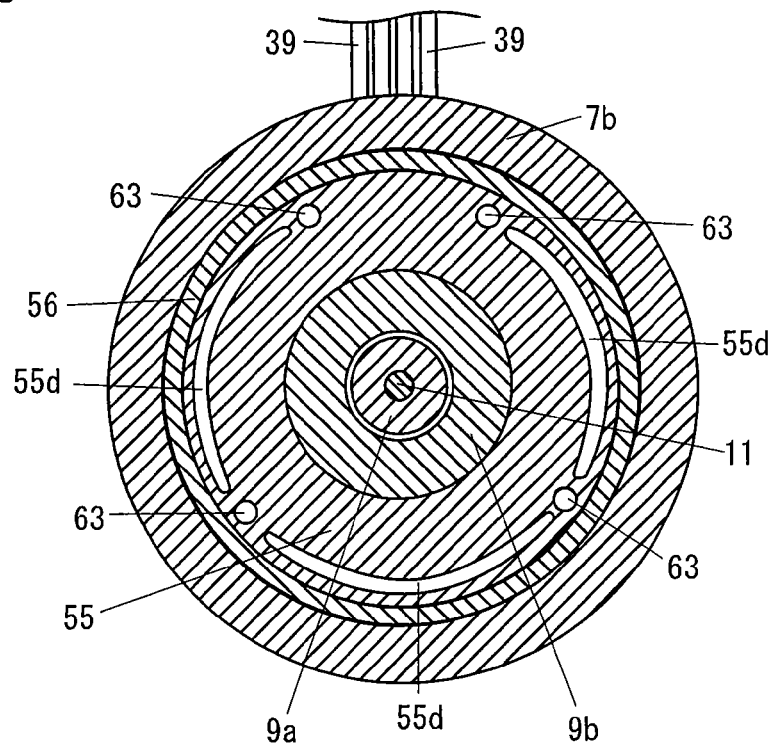
FIG. 8 is a view seen from a line VIII-VIII of FIG. 5.
Figure 9:
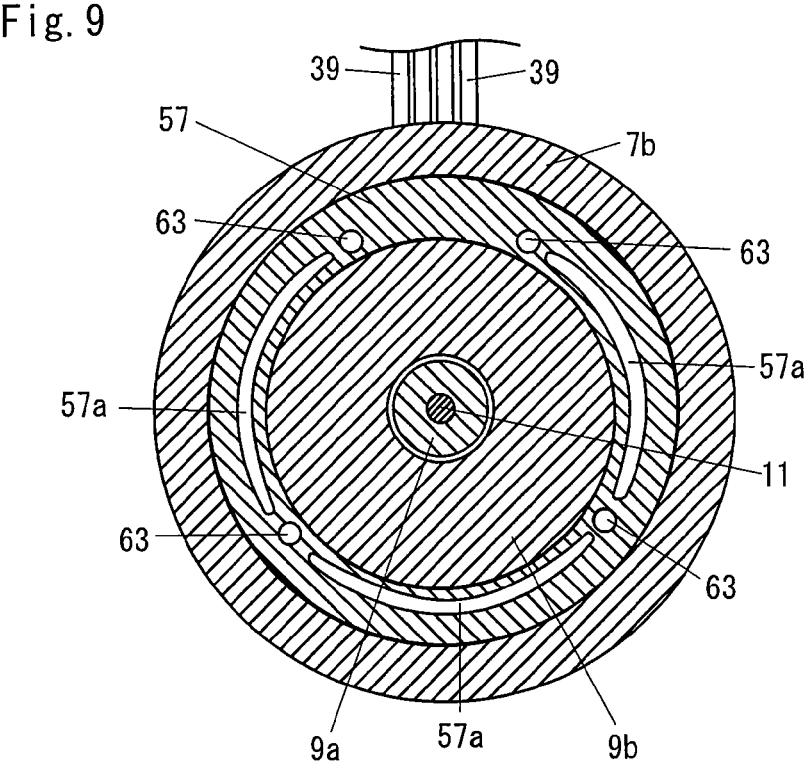
FIG. 9 is a view seen from a line IX-IX of FIG. 5.

FIG. 8 is a view seen from a line VIII-VIII of FIG. 5. FIG. 9 is a view seen from a line IX-IX of FIG. 5. As shown in FIG. 8, each of the through holes 55d has a circular arc shape extending in the circumferential direction as seen in the axial direction.

As shown in FIG. 9, the recessed portions 57a formed on the surface of the flange portion 41 (that is, the air flow path forming member 57) coming in contact with the first contact face 55b also has a circular arc shape extending in the circumferential direction as seen in the axial direction. That is, when are seen in the axial direction, the through holes 55d and the recessed portions 57a overlap each other and the recessed portions 57a are formed to continue from the through holes 55d in the axial direction.

In FIG. 8, the cooling space forming member 55 is fixed to the air flow path forming member 57 by bolts 63, and the through holes 55d and the recessed portions 57a extend in a circular shape in the regions where the bolts 63 do not exist. Meanwhile, if the radial positions of the bolts 63 do not correspond to the radial positions of the through holes 55d and the recessed portions 57a or the cooling space forming member 55 is fixed to the air flow path forming member 57 by other means except for the bolts 63, the through holes 55d and the recessed portions 57a may be formed in the shape of a continuous ring.

Meanwhile, for better understanding, the circumferential positions of the bolts 63 in FIGS. 8 and 9 are shown to be different from those of the bolts 63 in FIG. 5.

Since the through holes 55d are formed to extend in the circumferential direction as described above, the contact area between the coolant and the flange portion 41 can be increased. In addition, since the recessed portions 57a are also formed to extend in the circumferential direction, the contact area between the coolant and the flange portion 41 can be further increased. Therefore, it is possible to effectively cool the flange portion 41.

In the turbocharger 10 with an electric motor according to the above-mentioned embodiment of the present invention, the flange portion 41 integrally molded with the motor stator 9b extends outward from the coil arrangement portion of the motor stator 9b in the radial direction, at least a part of the radial outer face 41a of the flange portion 41 is exposed to the outside of the housing 7, the relative position of the stator assembly 12 with respect to the housing 7 can be adjusted in the circumferential direction, and the opening 41c of the wiring hole 41b is formed on the radial outer face 41a of the flange portion 41. Due to this structure, the circumferential position of the stator assembly 12 is adjusted with respect to the housing 7, so that the circumferential position of the opening 41c of the wiring hole can be adjusted. Therefore, it is possible to adjust the circumferential position of the opening 41c of the wiring hole without preparing separate parts.

The flange portion 41 is held and fixed between the bearing housing 7b and the compressor housing 7c so that the circumferential position thereof can be adjusted with respect to the bearing housing 7b and the compressor housing 7c. Therefore, when the flange portion 41 is held and fixed between the first and second housing members, it is possible to adjust the circumferential position of the flange portion, and to adjust the circumferential position of the opening 41c of the wiring hole 41b that is formed on the radial outer face 41a of the flange portion 41.

Further, when the bearing housing 7b and the compressor housing 7c are connected to each other in the axial direction, the flange portion 41 is held and fixed between the bearing housing 7b and the compressor housing 7c. Accordingly, the radial outer face 41a of the flange portion 41 may not be covered with the housing 7 in portions except for the portions that connect the bearing housing 7b to the compressor housing 7c. For this reason, in the circumferential range except for the portions that connect the bearing housing 7b to the compressor housing 7c, it is possible to expose the radial outer face 41a of the flange portion 41 to the outside of the housing 7 and to adjust the circumferential position of the opening 41c of the wiring hole 41b in this range.

In the embodiment of FIGS. 4 and 5, the compressor housing 7c has a portion that is positioned outside the radial outer face 41a of the flange portion 41 in the radial direction, and the notches 51 are formed at this portion. Therefore, the opening 41c of the wiring hole 41b formed on the radial outer face 41a of the flange portion 41 can be exposed to the outside of the housing 7 through the notches 51. In addition, since the notches 51 extend in the circumferential direction, it is possible to adjust the circumferential position of the opening 41c of the wiring hole 41b in the circumferential range where the notches 51 extend in the circumferential direction.

Since the flange portion 41 can be cooled by the coolant in the cooling space 55a and the cable 39 can pass through the flange portion 41, it is possible to effectively cool the cable 39.

Further, since the flange portion 41 forms at least a part of the flow path face of the compressed air flow path 33 that guides the compressed air from the compressor impeller 5, it is possible to maintain the cable 39 at low temperature.

That is, the temperature of the compressed air from the compressor impeller 5 is lower than that of the exhaust gas delivered to the turbine impeller 3, and the cable 39 passes through the flange portion 41 forming the compressed air flow path 33 in which the low-temperature compressed air flows. Therefore, it is possible to keep the cable 39 under low-temperature environment. As a result, it is possible to maintain the cable 39 at low temperature.

In the abovementioned embodiment, the annular face is a plane of which a normal line is parallel to the axial direction. However, the present invention is not limited thereto, and the normal line of the annular face may be inclined with respect to the axial direction.

The bearing housing 7b and the compressor housing 7c of the above-mentioned embodiment correspond to first and second housing members of claims, respectively. However, the first and second housing members are not limited as long as the first and second housing members form the housing 7, and the first and second housing members may not be necessarily the bearing housing 7b and the compressor housing 7c.

Further, the notches 51 have been formed on the compressor housing 7c in the above-mentioned embodiment. However, the present invention is not limited thereto, and the notches may be formed at a portion (the bearing housing 7b or the turbine housing 7a) of the housing 7 of the turbocharger except for the compressor housing 7c.

The above-mentioned through holes 55d and recessed portions 57a may not be formed. In this case, the flange portion 41 is cooled by the coolant with the cooling space forming member 55 interposed therebetween.

As for the rest, the present invention is not limited to the above-mentioned embodiment, and it is natural that various modifications may be made thereto without departing from the scope and spirit of the present invention.

What is claimed is:

1. A turbocharger provided with an electric motor in which a turbine impeller is connected to one end of a rotating shaft, wherein a compressor impeller is connected to the other end of the rotating shaft, and the rotating shaft is rotatably supported by a bearing housing in which is provided at least one bearing, wherein the rotating shaft is rotationally driven by the electric motor provided in the bearing housing, and the electric motor includes a motor rotor that is fixed to the rotating shaft and a motor stator that surrounds the motor rotor and that rotationally drives the motor rotor, wherein the turbocharger further comprises:
   (a) a stator assembly that includes the motor stator and a flange portion integrally formed with the motor stator, wherein a position of the stator assembly is adjusted with respect to the bearing housing in a circumferential direction along a circle that has an axial center of the rotating shaft as a center thereof, wherein the flange portion extends outward from a coil arrangement portion of the motor stator in a radial direction, and at least a part of a radial outer face of the flange portion is exposed to the outside of the bearing housing, and the flange portion includes a wiring hole through which a cable connected to coils of the motor stator passes, and the wiring hole is opened at the radial outer face of the flange portion, and wherein the bearing housing includes a cooling space in which coolant for cooling the motor stator flows, and the flange portion of the stator assembly is arranged to come in contact with the coolant, or with a cooling space forming member that forms at least a part of an inner surface of the cooling space, wherein the coolant comprises cooling water or cooling oil.

2. The turbocharger according to claim 1, further comprising:
   (b) a compressor housing connected to the bearing housing, wherein the compressor housing receives the compressor impeller therein, and the flange portion of the stator assembly is held and fixed between the bearing housing and the compressor housing so that a position of the flange portion is adjusted with respect to the bearing housing and the compressor housing in a circumferential direction.

3. The turbocharger according to claim 2, wherein the compressor housing includes
   i. a first portion that is positioned outside the radial outer face of the flange portion in the radial direction; and
   ii. a plurality of notches that extend in the circumferential direction along the circle that has the axial center of the rotating shaft as the center thereof, and the plurality of notches are disposed at the first portion.

4. The turbocharger according to claim 2, wherein the flange portion of the stator assembly forms at least a part of a flow path face of a compressed air flow path that guides compressed air from the compressor impeller.

5. The turbocharger according to claim 3, wherein the flange portion of the stator assembly forms at least a part of a flow path face of a compressed air flow path that guides compressed air from the compressor impeller.

6. A turbocharger provided with an electric motor in which a turbine impeller is connected to one end of a rotating shaft, wherein a compressor impeller is connected to the other end of the rotating shaft, and the rotating shaft is rotatably supported by a bearing housing in which is provided at least one bearing, wherein the rotating shaft is rotationally driven by the electric motor provided in the bearing housing, and the electric motor includes a motor rotor that is fixed to the rotating shaft and a motor stator that surrounds the motor rotor and that rotationally drives the motor rotor, wherein the turbocharger further comprises:
   (a) a stator assembly that includes the motor stator and a flange portion integrally formed with the motor stator, wherein a position of the stator assembly is adjusted with respect to the bearing housing in a circumferential direction along a circle that has an axial center of the rotating shaft as a center thereof, wherein the flange portion extends outward from a coil arrangement portion of the motor stator in a radial direction, and at least a part of a radial outer face of the flange portion is exposed to the outside of the bearing housing, and the flange portion includes a wiring hole through which a cable connected to coils of the motor stator passes, and the wiring hole is opened at the radial outer face of the flange portion, and wherein the bearing housing includes a cooling space in which coolant for cooling the motor stator flows, and the flange portion of the stator assembly is arranged to come in contact with the coolant, or with a cooling space forming member that forms at least a part of an inner surface of the cooling space; and
   (b) a compressor housing connected to the bearing housing, wherein the compressor housing receives the compressor impeller therein, and the flange portion of the stator assembly is held and fixed between the bearing housing and the compressor housing so that a position of the flange portion is adjusted with respect to the bearing housing and the compressor housing in a circumferential direction,
   wherein the compressor housing includes
   i. a first portion that is positioned outside the radial outer face of the flange portion in the radial direction; and
   ii. a plurality of notches that extend in the circumferential direction along the circle that has the axial center of the rotating shaft as the center thereof, and the plurality of notches are disposed at the first portion.

7. A turbocharger provided with an electric motor in which a turbine impeller is connected to one end of a rotating shaft, wherein a compressor impeller is connected to the other end of the rotating shaft, and the rotating shaft is rotatably supported by a bearing housing in which is provided at least one bearing, wherein the rotating shaft is rotationally driven by the electric motor provided in the bearing housing, and the electric motor includes a motor rotor that is fixed to the rotating shaft and a motor stator that surrounds the motor rotor and that rotationally drives the motor rotor, wherein the turbocharger further comprises:

(a) a stator assembly that includes the motor stator and a flange portion integrally formed with the motor stator, wherein a position of the stator assembly is adjusted with respect to the bearing housing in a circumferential direction along a circle that has an axial center of the rotating shaft as a center thereof, wherein the flange portion extends outward from a coil arrangement portion of the motor stator in a radial direction, and at least a part of a radial outer face of the flange portion is exposed to the outside of the bearing housing, and the flange portion includes a wiring hole through which a cable connected to coils of the motor stator passes, and the wiring hole is opened at the radial outer face of the flange portion, and wherein the bearing housing includes a cooling space in which coolant for cooling the motor stator flows, and the flange portion of the stator assembly is arranged to come in contact with the coolant, or with a cooling space forming member that forms at least a part of an inner surface of the cooling space, wherein the coolant comprises cooling water or cooling oil; and (b) a compressed air flow path that guides compressed air from the compressor impeller, wherein the flange portion of the stator assembly forms at least a part of a flow path face of the compressed air flow path that guides compressed air from the compressor impeller.

8. The turbocharger according to claim 6, wherein the flange portion of the stator assembly forms at least a part of a flow path face of a compressed air flow path that guides compressed air from the compressor impeller.

9. The turbocharger according to claim 6, wherein the plurality of notches consist of five notches.

10. The turbocharger according to claim 6, wherein an opening of the wiring hole is exposed to outside of the compressor housing through notches of the compressor housing.

11. The turbocharger according to claim 6, wherein coolant contacting the flange portion of the stator assembly, or contacting the cooling space forming member in contact with the flange portion of the stator assembly, cools both the flange portion and the cable passing through the wiring hole of the flange portion.

12. The turbocharger according to claim 11, wherein the flange portion of the stator assembly forms at least a part of a flow path face of a compressed air flow path that guides low-temperature compressed air from the compressor impeller so that the cable passing through the wiring hole of the flange portion is kept under a low-temperature environment.

13. The turbocharger according to claim 6, wherein the flange portion of the stator assembly forms at least a part of a flow path face of a compressed air flow path that guides low-temperature compressed air from the compressor impeller so that the cable passing through the wiring hole of the flange portion is kept under a low-temperature environment.

* * * * *